United States Patent [19]

McKnight

[11] Patent Number: 4,738,180
[45] Date of Patent: Apr. 19, 1988

[54] INSTRUMENT CASE AND STAND

[76] Inventor: Edmund McKnight, 22 Breezy Hill Ter., Nahant, Mass. 01908

[21] Appl. No.: 899,553

[22] Filed: Aug. 25, 1986

[51] Int. Cl.⁴ .......................... G10D 9/00; G10G 5/00
[52] U.S. Cl. ................. 84/385 A; 84/387 A; 84/453; 206/314; 248/435; 248/443
[58] Field of Search ................. 84/379, 385 A, 387 A, 84/421, 453; 248/168–170, 435, 436, 443, 450, 451, 458; 206/314

[56] References Cited

U.S. PATENT DOCUMENTS

| | | |
|---|---|---|
| 515,649 | 2/1894 | Brookmire, Jr. |
| 1,888,927 | 11/1932 | Lang . |
| 1,900,718 | 3/1933 | Lang . |
| 1,988,718 | 1/1935 | Cook et al. . |
| 3,357,666 | 12/1967 | Smith et al. ........................ 248/125 |
| 3,637,070 | 1/1972 | Friedman ............................ 206/13 |
| 3,741,509 | 6/1973 | Kelly .................................. 248/171 |
| 4,145,950 | 3/1979 | Glantz ................................ 84/385 |
| 4,381,690 | 5/1983 | Kimble ................................ 84/422 |
| 4,407,182 | 10/1983 | Biasini ................................ 84/453 |
| 4,529,865 | 7/1985 | Oakes, Jr. ........................... 219/201 |
| 4,657,267 | 4/1987 | Jaumann et al. ................. 248/170 X |

Primary Examiner—Benjamin R. Fuller
Attorney, Agent, or Firm—Kenway & Crowley

[57] ABSTRACT

A combined carrying case and stand for belled musical instruments, primarily those of the brass and woodwind types, including a housing for protection against damage and a base which incorporates a support mechanism to safely secure the instrument exposed in an upright position and conveniently available for use. The combination includes a one-piece protective housing attachable to a base having mechanically extendable legs tangentially radiating from the base at fixed spaced pivot points. The base also includes a centerpost contoured to a particular instrument which with the legs extended assures maximum stability of the instrument when placed in a vertical position.

4 Claims, 3 Drawing Sheets

INSTRUMENT CASE AND STAND

BACKGROUND OF THE INVENTION

Conventional cases used to transport musical instruments, particularly those of the brass and wood categories, are excessively bulky, heavy and do not afford adequate protection against damage to the instrument or other contents. Some effort has been made to lighten cases by constructing them of flexible plastics with zipper closures. Unfortunately, any advantages of light weight achieved are frequently more than offset by the sacrifice in protective qualities. Other available cases are of rigid construction, resembling suitcases with piano-type hinges and a total lack of conformity to the configuration of the instrument being transported. Not only are they excessively heavy, they are cumbersome to handle and difficult to store. Moreover, in such a case the instrument is not restrained from possibly damaging movement within the case. Because professional musicians are often required to travel extensively between contract engagements, weight, handling, storage, and security against damage are of key significance in the proper design of an instrument case.

Professional musicians are also expected usually to possess the talent to play more than one instrument, and are frequently required to do so during a single performance. Worse yet, a rapid transition from one instrument to another must often be made on a poorly illuminated stage or in a darkened orchestra pit. To make such a rapid transition, it is the custom to provide some sort of stand or support in proximity to the musician for each instrument. At the same time, the instrument must be protected from inadvertent tipping should it be bumped as it rests, usually in a bell downward position. Acoustic characteristics of the brass family of instruments are particularly sensitive to dents or deformation which are easily caused by rough treatment.

It has therefore been recognized that an urgent need exists for a multi-purpose transport and protection case unique to the configuration of each instrument. The primary object of this invention is to satisfy that need.

Another object of the invention is to provide hardcover but cushioned protection against damage to an instrument during transit by means of a one-piece cover of rigid lightweight molded plastic construction.

Still another object is to afford ease of handling through employment of multiple grips, slings and non-slip surfaces on the instrument case where required.

A further object is to provide a case having internal, secure storage for such accessories as mouthpieces, reeds and lubricating oils as required.

A still further object is to provide internal padding of foam rubber or the equivalent to protect all contents of the case and especially the musical instrument from mishandling by means of calculated compressive loading.

Yet a further object is to provide in combination with the case a base containing a mechanism to extend supporting legs which will substantially lower the center of gravity and prevent tipping of an instrument resting in an upright position adjacent a musician.

Another object is to provide a luminous center support post to aid in rapidly positioning an instrument under low light conditions.

SUMMARY OF THE INVENTION

Generally, the invention is concerned with a combined case and stand for belled musical instruments in which the case has a hard, durable exterior and a padded conforming interior which provides excellent protection for the instrument under harsh conditions while the stand provides a convenient and sturdy rest member on which the instrument can be retained for convenient access by the musician. The stand is contained in and associated with a base to which the major housing or case member may be detachably but securely joined to enclose and protect the instrument. The stand includes a plurality of extension legs which are easily and simultaneously deployable from the base to form a stable wide-diameter structure which inherently resists tipping or falling on its side when it is bumped or otherwise accidentally disturbed. The stand also includes a contoured centerpost for holding the instrument in an upright position easily accessible to the musician, the top of the post being illuminated or luminous to permit the musician to properly locate his instrument in its rest position on the base.

These and other objects, features and advantages will become apparent from a reading of the specification of a preferred embodiment of the invention in conjunction with the appended drawing in which:

DESCRIPTION OF PREFERRED EMBODIMENT

Figure 1:
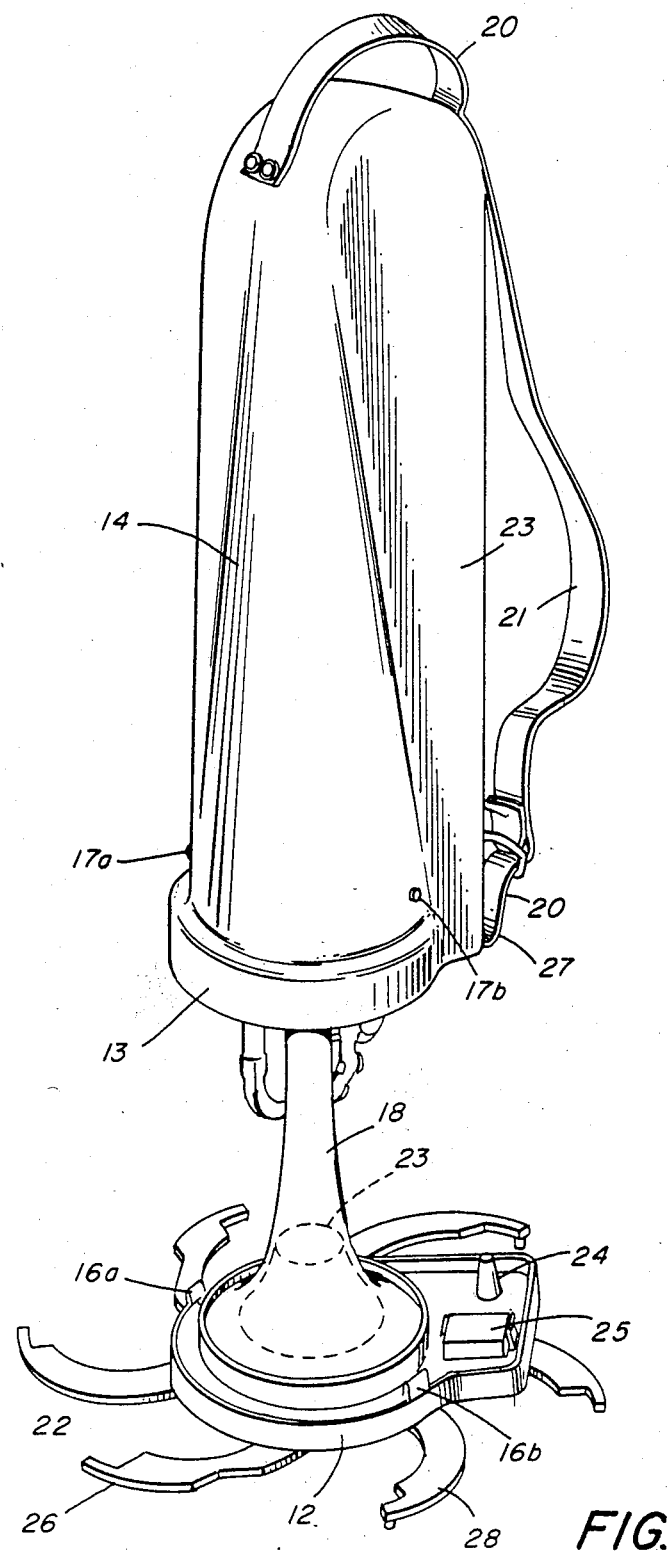
FIG. 1 is a perspective view of a combined instrument case and stand embodying the present invention.

FIG. 1 shows one embodiment of the combined carrying case and stand, the housing and base being partially separated to show the two basic components, namely, a base 12 and a housing or case 14. The housing has a bottom flange 13 which fits closely over the base. Latches 16a and 16b for holding the two together are mounted at diametrically opposite points on the base, and cooperating latch releases 17a and 17b permit removal of the housing 14. The case is preferably heavily padded in its interior and the padding conforms to the outline of an instrument such as the horn 18. The exterior of the case is of relatively hard inflexible material such as molded high-impact plastic and has brackets such as 20 fixed to its exterior to accommodate a sling or web such as 21. Extending upwardly from the base into the interior of the case is a cone 22 contoured to fit the interior of the bell of the instrument 18. For purposes explained more fully below, the cone 22 may include an upper portion or top 23 made luminous by suitable phosphorescent paint or, if desired, a battery-operated light or light-emitting diode.

The case may be contoured as at 27 to conform to the shape of the instrument and its operating valves. Also, to accommodate accessories such as mouthpieces, reeds, lubricating oils, and the like, a post 24 for a mouthpiece and a spring clip 25 may be mounted on an offset extension of the base which is enclosed by the housing 14 when that element is secured to the base 12. The spring clip 25 is useful to hold a bottle of lubricating oil or other small accessories. Two sets of arcuate legs 26 and 28 are shown extending from the base 12 to increase its diameter by a significant amount, and accordingly to provide great stability and resistance to tipping, as explained further hereinbelow.

Figure 2:
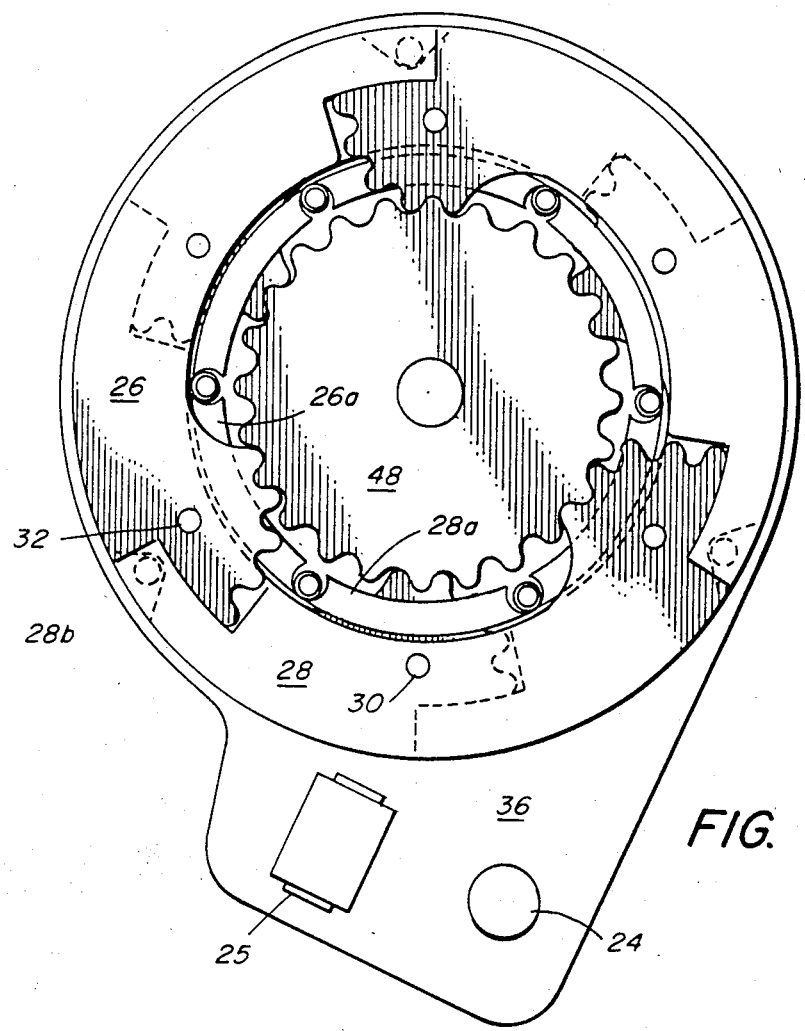
FIG. 2 is a partial plan view of the base of the combination of FIG. 1 wherein the extension legs are shown retracted.
Figure 3:
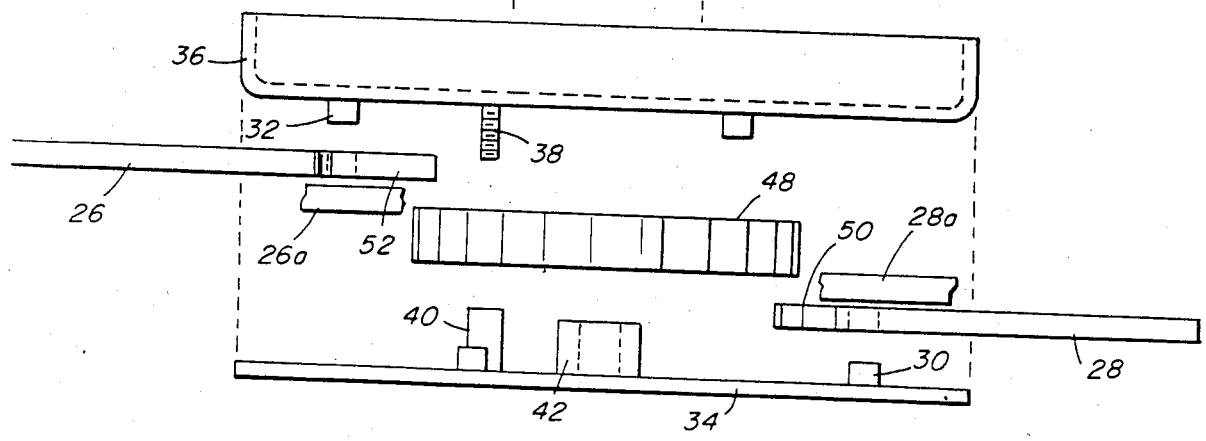
FIG. 3 is a view similar to that of FIG. 2 wherein the mechanism by which a the extension legs are deployed is shown.

The base 12 is shown partially in plan view in FIG. 2. The offset extension of the base, which serves to accommodate the accessories as noted above, is actually part of an upper base plate 36. In the interior of the base beneath the upper plate, six pivotable arcuate legs are provided. The legs are identical in shape and are arranged in two layers of three each. As also shown in the exploded view of FIG. 3, the leg 26 is typical of the three in the upper layer and the finger 28 is typical of the three in the lower layer. Each of the legs of the lower layer turns on a pivot pin such as 30 and each of the legs of the upper layer turns on a pivot pin such as 32. Upper and lower leg security and freedom for rotational motion are afforded by spacers, 26a and 28a, respectively. The pivot pin 30 and those of the other legs of the lower layer is fixedly mounted on a lower base plate 34 to which the upper base plate 36 is joined by means of a bolt 38 and threaded boss 40. The boss 40 is also fixedly mounted to the lower base plate 34. The pivot pin 32 and those for the other legs of the upper layer are fixedly mounted on the lower surface of the upper base plate 36. The pivot pins 30 and 32 are disposed in a circular array, equally spaced from one another in such a manner that the ends of the legs form a projected circle of diameter double that of the base 12.

Extending upwardly from the center of the lower base plate 34 is an internally threaded socket of relatively large diameter 42 into which a central tie-rod 44 is threaded. The central tie-rod 44 passes through a post 46 which is arranged to accommodate the cone 22 seen in FIG. 1. The cone 22 is preferably formed of foam such as polyurethane, and the tie-rod 44 extends not only through the cone 22 but also through a post mounted upon the cone. At the top of the post, a luminous hemispherical cap 23, preferably of luminescent foam, is formed. Alternatively, a transparent plastic cap may be fixed to the post, serving as a cover for a battery-powered bulb or light-emitting diode. A recess cavity for a battery may be formed in the cone 22 with leads conducted through the tubular tie-rod 44.

The tie-rod 44 also passes through the upper base plate 36 and is threaded into the socket 42 to bring the component parts together. A sprocket 48 is rotatable upon the bushing 42 and is of sufficient thickness to mesh simultaneously with gear teeth 50 formed on the legs of the lower layer and gear teeth 52 formed on the legs of the upper layer. Each of the legs of the upper layer is provided with a foot such as shown at 54 in order that a level plane may be established when the legs are deployed as in FIG. 1. A suitable recess 28b in each of the three lower legs is provided for each foot when the legs are retracted.

Figure 4:
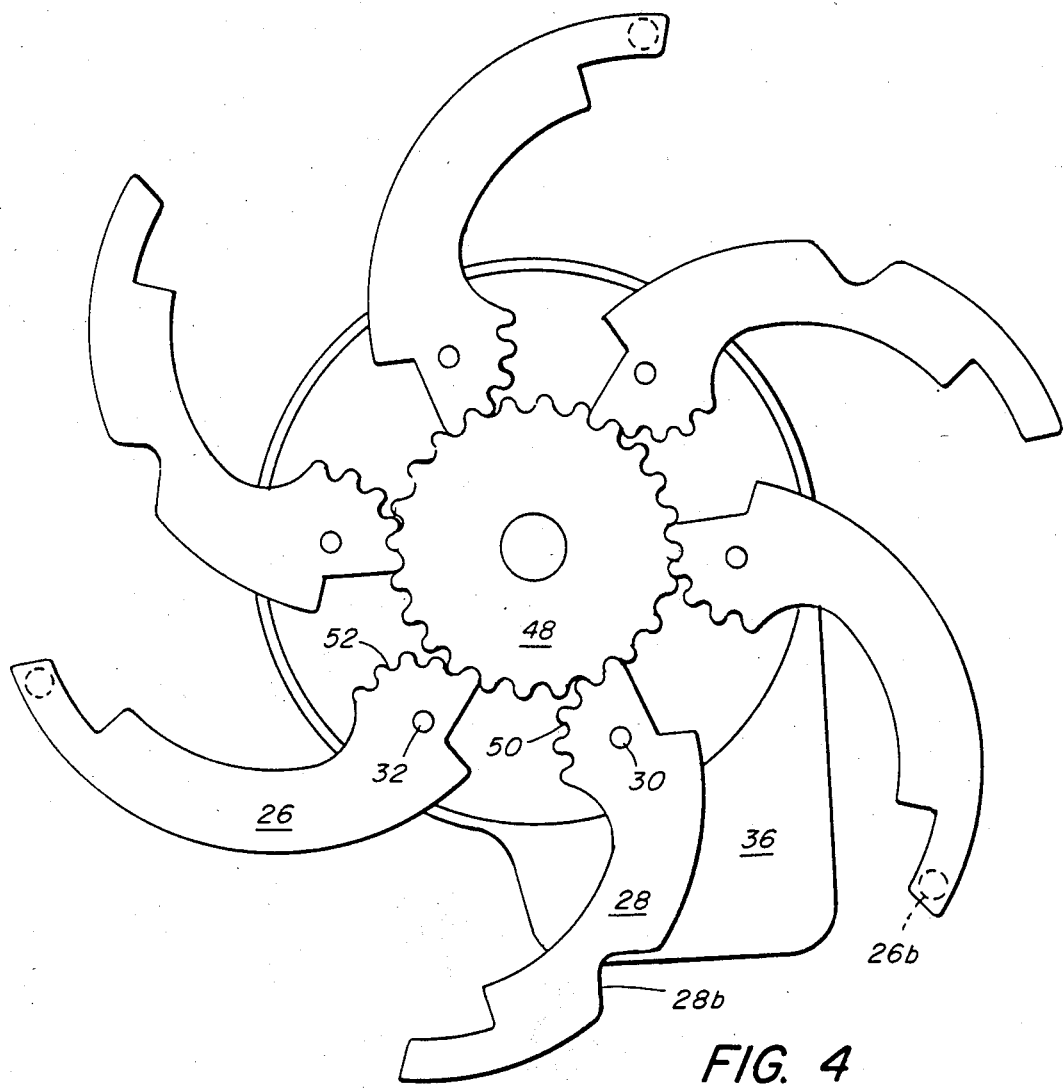
FIG. 4 is a cross-sectional view of the base showing further mechanical detail.

FIG. 4 is a sectional view of the mechanical elements of the stand illustrating the position of the various legs when they are deployed. It will be noted that the diameter of the base is enlarged by a factor of 2 to 1 when the legs are deployed, providing a stable platform and lowering the center of gravity of the instrument to such a degree that tipping cannot occur.

When the case is being used to transport or store the instrument, the flange 13 of the housing fits closely over the periphery of the base 12 and weatherproof enclosure of the instrument is had. Moreover, the latches 16a–17a and 16b 17b provide double assurance that the housing will not inadvertently be opened. Interior padding of material such as polyurethane foam cushions and cradles the instrument in a fixed position secure from damage. The outer shell of the housing being of high-impact resistant plastic further militates against damage during transport and storage. Finally, the enclosure of the base 12 by the flange 13 ensures that the legs will not be accidentally deployed when the instrument is being transported or stored.

To deploy the legs of the base when the instrument is to be made available for use during a performance, any one of the legs may be manually pivoted outwardly. The sprocket 48 will then rotate and cause all other legs of both layers to be similarly deployed. The luminous or illuminated cap 23 provides an easily visible reference point for the musician to rest the instrument in a bell-downward position when another instrument is to be used.

The design of the combined carrying case and stand lends itself to use with a wide variety of instruments. Although a case for a particular horn has been shown and described, the invention is applicable far more broadly and should be limited only the the spirit and scope of the appended claims.

What is claimed is:

1. A combined carrying case and stand for a belled musical instrument comprising a base of a given diameter, a housing and means for attaching said housing to said base to enclose said instrument and thereby to form said carrying case, said base including a plurality of pivotable legs having inner and outer ends normally disposed in a generally circular array within said base, a plurality of gear teeth being formed adjacent the inner ends of each of said legs and means including a rotatable sprocket having teeth meshing with those of said legs for simultaneously deploying said legs to extend beyond said given diameter whereby a stable platform serving as a stand is formed.

2. A combined carrying case and stand as defined in claim 1 wherein said base further includes a centrally disposed upstanding centerpost at least a portion of which is contoured to match the internal configuration of said belled instrument.

3. A combined carrying case and stand as defined in claim 1 wherein a first group of said plurality of pivotable legs is disposed in a first plane and a second group of said pivotable legs is disposed in a second plane parallel to said first plane, feet being formed adjacent the outer ends of each of said legs of said first group, said feet extending to the plane of said second group.

4. A combined carrying case and stand as defined in claim 2 and further including a light-emitting cap formed on the top of said upstanding centerpost.

* * * * *